United States Patent
Rabinovich et al.

(10) Patent No.: US 11,650,956 B2
(45) Date of Patent: May 16, 2023

(54) PRIORITIZING BACKUP OF ENDPOINT DEVICES IN ENTERPRISE NETWORK ENVIRONMENTS

(71) Applicant: VMware, Inc., Palo Alto, CA (US)

(72) Inventors: Dmitry Rabinovich, Herzliya (IL); Meytal Genah, Herzliya (IL); Anton Gartsbein, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 411 days.

(21) Appl. No.: 14/709,402

(22) Filed: May 11, 2015

(65) Prior Publication Data
US 2016/0335283 A1 Nov. 17, 2016

(51) Int. Cl.
*G06F 16/17* (2019.01)
*G06F 11/14* (2006.01)

(52) U.S. Cl.
CPC .......... *G06F 16/17* (2019.01); *G06F 11/1448* (2013.01)

(58) Field of Classification Search
CPC . G06F 17/30129; G06F 11/1448; G06F 16/17
USPC ......................................................... 707/640
See application file for complete search history.

(56) References Cited

U.S. PATENT DOCUMENTS

| 8,732,479 | B1* | 5/2014 | Henriksen | G06F 11/1448 709/201 |
|---|---|---|---|---|
| 8,924,352 | B1* | 12/2014 | Andruss | G06F 11/1451 707/654 |
| 9,372,716 | B1* | 6/2016 | Ramani | G06F 8/61 |
| 9,684,563 | B1* | 6/2017 | Wartnick | G06F 11/1458 |
| 2008/0155215 | A1* | 6/2008 | Matsuzaki | G06F 11/1456 711/E12.103 |
| 2008/0168516 | A1* | 7/2008 | Flick | H04N 21/23106 725/112 |
| 2008/0177994 | A1* | 7/2008 | Mayer | G06F 9/4418 713/2 |
| 2011/0202504 | A1* | 8/2011 | Cherkasova | G06F 11/1451 711/111 |
| 2011/0276823 | A1* | 11/2011 | Ueno | G06F 11/1464 714/E11.073 |
| 2013/0332505 | A1* | 12/2013 | Karandikar | G06F 11/1461 709/202 |
| 2014/0006350 | A1* | 1/2014 | Fukui | G06F 16/178 707/632 |
| 2014/0052694 | A1* | 2/2014 | Dasari | G06F 11/1461 707/654 |
| 2014/0068212 | A1* | 3/2014 | Lin | H04L 47/00 711/162 |
| 2014/0297742 | A1* | 10/2014 | Lyren | H04L 67/1044 709/204 |
| 2015/0088831 | A1* | 3/2015 | Hamborg | G06F 16/113 707/652 |
| 2015/0278024 | A1* | 10/2015 | Barman | H04L 67/61 707/634 |

(Continued)

*Primary Examiner* — Ashish Thomas
*Assistant Examiner* — Abdullah A Daud

(57) ABSTRACT

A backup system is described for prioritizing backup data in enterprise networks. Messages containing data to be backed up are received at a backup server from endpoint devices and a priority value is determined for each message based on numerous factors, such as the organizational role of the user of the endpoint, the time since last backup, average upload speed, frequency of backups, and other properties. The system prioritizes backing up of messages based on the priority value of the messages.

20 Claims, 5 Drawing Sheets

(56) References Cited

U.S. PATENT DOCUMENTS

2016/0078068 A1\* 3/2016 Agrawal .......... G06F 17/30303
707/692

\* cited by examiner

PRIORITIZING BACKUP OF ENDPOINT DEVICES IN ENTERPRISE NETWORK ENVIRONMENTS

TECHNICAL FIELD

The present disclosure generally relates to techniques for backing up computing devices, and more specifically to performing backups of endpoint devices on an enterprise network.

BACKGROUND

In today's world, computers form the backbone in the operations of most organizations. Employees increasingly rely on computers as a medium for communication, to store information, and to provide vital tools to perform their jobs. Accordingly, losing a computer, and the data and applications on it, can be catastrophic to an individual's work and ultimately to the organization. Further, computers are complex and prone to failures resulting in loss of data on the machine, which may be difficult or impossible to recover.

Accordingly, the practice of backing up computers has become standard in most organizations. Typically, enterprise machines are connected to a network and are periodically backed up through the network. Such backups generally save copies of certain user files or a complete copy of a user's desktop image on a database. Such a backup database may be located remotely or within the enterprise. In the event of computer failure or other loss, the user's files or a copy of the user's desktop image can be retrieved from the database and downloaded to a computer to enable the user to resume work without significant interruption.

However, several problems still persist. For example, due to limitations imposed by hardware and network bandwidth, it may take time to backup large numbers of endpoints, or endpoints with large volumes of backup data. Particularly during the initial backup process when all of the content on each individual device needs to be backed up to a central server, the backup process can take a substantial amount of time due to the large numbers of devices and volumes of data involved. Even subsequently, when the backup process only uploads changes to files and data that are already stored in a backup database (as opposed to completing a full system backup), in the case of heavy data producers, such as software developers, or during an initial upload of a new endpoint, or in other situations where large amounts of data are backed-up, significant delays in backup completion can result that impact all endpoints backing-up to the same destination. Further, some devices may only be connected to the network for a limited amount of time, which may not be enough to complete a backup, particularly when there are delays caused by other endpoints backing up to the same destination. For example, such a situation may be common for traveling employees.

As a result, numerous endpoint devices on the network may be delayed in or prevented from achieving a full backup, creating a risk of data loss in the case of computer failure or other unforeseen event. Furthermore, because a typical enterprise backup system is not able to distinguish between different types of backup data, data that is more valuable to the organization, such as data on an executive's endpoint, might be prevented from or delayed in getting backed-up because other data, which may be less valuable, consumes too much of the system's resources. What is needed is a more efficient way for organizations to prioritize backing up of endpoints.

DETAILED DESCRIPTION

Figure 1:
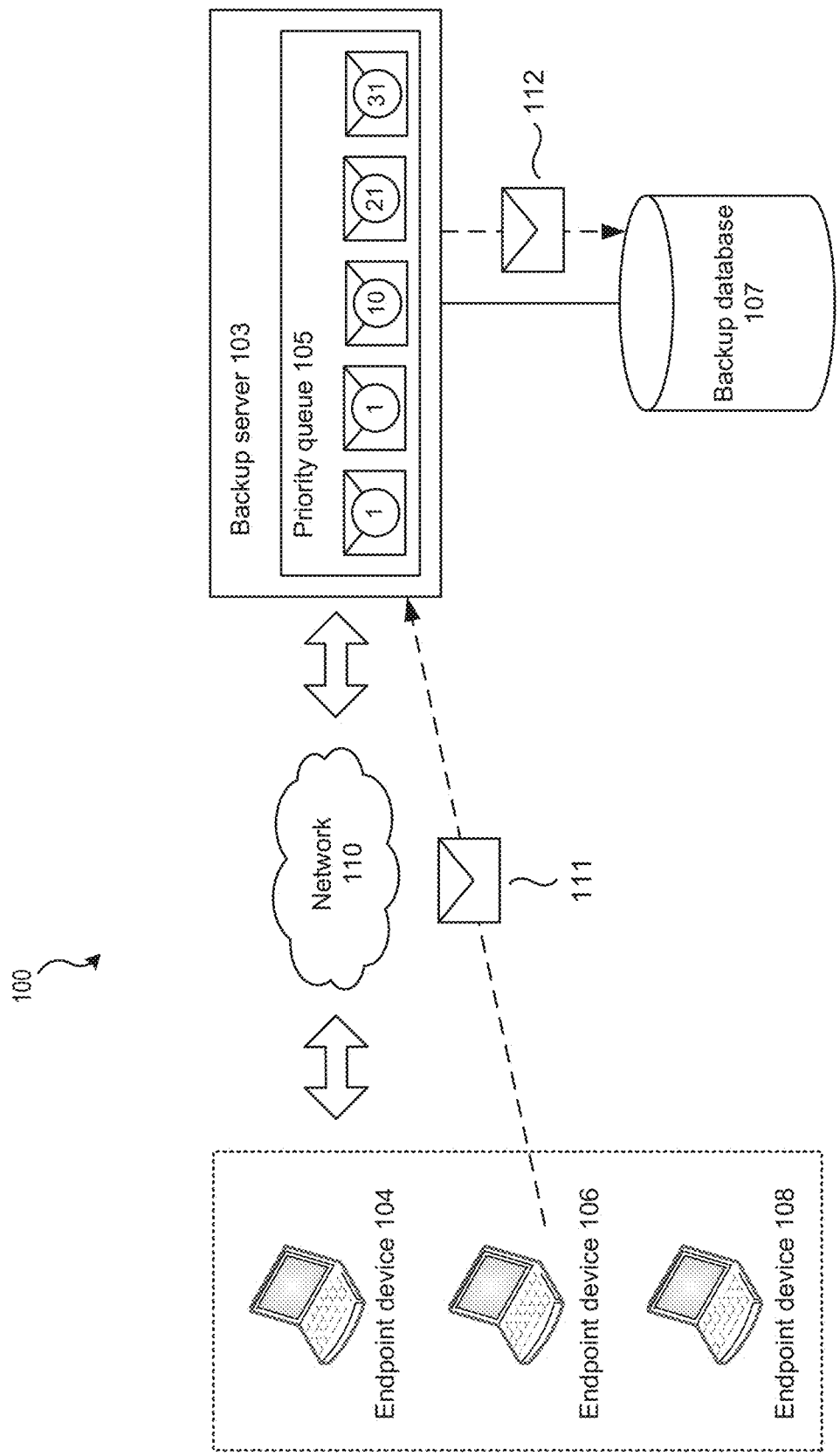
FIG. 1 illustrates an example environment of an enterprise network and a backup server, in accordance with various embodiments.

Systems and methods in accordance with various embodiments of the present disclosure overcome at least some of the above-mentioned shortcomings and deficiencies by providing more efficient ways to prioritize backups of endpoint devices on backup servers in enterprise networks. In particular, embodiments provided herein describe a backup system that assigns priority values to backup data that is received from endpoints based on the relative importance of the backup data, which is determined based on numerous factors. Subsequently, higher priority data is prioritized during backup over lesser priority data. As a result, the system optimizes the use of resources to protect data in the enterprise.

In various embodiments, to backup data, endpoint devices on an enterprise network send the backup data to a backup server. At the backup server, the messages containing the backup data are placed in a queue until the messages can be written to a backup database. Generally, because numerous endpoints may be backing up data to one destination, the backend storage can be the main bottleneck in the system, for example due to limitations such as write speed to disk. Accordingly, messages are kept in the queue until they can be written to disk.

Each message received at the server is assigned a priority value. The priority value of each message is determined based on various factors, as described further below. The messages are placed in the queue according to their priority values such that messages with higher priority values are prioritized for being written to disk over messages with lower priority values. For example, higher priority messages may be written to disk before lower priority messages or higher priority messages may be allocated more resources for being written to disk, such as by assigning a higher number of working threads, so that more input/output operations per second ("IOPS") are allocated to higher priority messages.

Message priority values can be determined based on various factors. For example, such factors can be related to properties of the endpoint device. Priority of a message can be determined based on the organizational role of the user of an endpoint device. For example, messages from an executive's, such as a chief executive officer's ("CEO's"), endpoint device can be assigned a high priority value because it may be critical to the organization to keep the CEO's device constantly backed up. Similarly, devices belonging to sales employees of the organization may be prioritized over other employees if sales data is considered to be important.

In other embodiments, endpoint devices that are nearing completion of a backup can be given higher priority to speed up finishing the backup. Endpoints that are not connected to the network as often as others can be given higher priority to increase the likelihood that the endpoint will be backed up in the limited time during which it is connected. Endpoints that have not been backed up for a long time can be given higher priority because they may contain a lot of data that has not been backed up. Endpoints that experience faster upload speeds than the usual upload speed of the endpoint can be given higher priority to take advantage of the increased upload speed. Endpoints with a lot of unique data, as opposed to data that might also appear on other machines, can be assigned higher priority because unique files are likely to be more valuable, such as files that are unique creations of a user, than files appearing on other endpoints, which are likely downloadable or otherwise obtainable from elsewhere and are of less critical importance.

FIG. 1 illustrates an example environment of an enterprise network and a backup server, in accordance with various embodiments. As illustrated in the example of FIG. 1, an environment 100 includes endpoint devices 104, 106, 108 connected via a network 110 to a backup server 103. An endpoint device (e.g., 104, 106, 108) can be any computing device, such as a laptop, desktop, tablet, smartphone, etc. that is used by an end user in the enterprise network. Network 110 may further include numerous other components, such as one or more firewalls, connection brokers, management servers, etc. The backup server 103 can be enabled by one or more computing devices. The backup server 103 may be located remotely with respect to the enterprise, such as in a data center. Message (e.g., 111) containing backup data are conveyed from the endpoint devices 104, 106, 108 over the network 110 to the backup server 103. For example, message 111 is conveyed from endpoint 106 to the server 103. In the server 103, messages (e.g., 111) are temporarily stored in a priority queue 105 before being written to a backup database 107.

A message (e.g., 111) can contain any files, portions of files, blocks, packets, data, or other information that is to be backed up by the backup server 103. In various embodiments, to lower the amount of data transfer, the system can only back up files and data that have changed on an endpoint since the previous backup, and which is different from the data that is already backed up on the database 107.

In the queue 105, messages (e.g., 111) can be assigned different priority values based on numerous factors, as described further below. For example, as illustrated, the queue 105 can contain messages with priority values ranging from 0 to 31. Messages with higher priority values can be given priority in being written to the database 107. Accordingly, a message 112 is written to the database 107 based on its priority. For example, in an embodiment, messages can be written to the database from the front of the queue, namely, they can be written in order of decreasing priority with the highest priority messages being written first. In another embodiment, higher priority messages in the queue 105 can be permitted more TOPS to speed up writing of those messages to the database 107. In yet another embodiment, the system can assign more threads to storing higher priority messages. For example, the largest number of threads can be assigned to storing highest priority messages and the lowest number of threads can be assigned to storing the lowest priority messages.

In many cases, a backup database in an enterprise may be comprised of numerous independent volumes, where writing data to one volume does not interfere with writing data to another volume, or where there is otherwise not competition for resources between the different volumes. In various embodiments, the system may contain a separate queue for separate volumes in order to better utilize resources. To further optimize use of resources, high priority endpoints can be distributed uniformly between volumes to reduce competition for backup resources between high priority endpoints.

In various embodiments, a priority value of a message can be determined based on numerous factors. In an embodiment, a priority value of a message can be based on the organizational role of the user of the corresponding endpoint. For example, the system can be configured to give all the endpoints used by key individuals, such as executives or vice presidents, high priority. Also, endpoints of individuals in roles that are at higher risk of data loss, for example due to frequent traveling or infrequent connection such as sales persons, can be assigned higher priority values. In various embodiments, the system can access user profiles on endpoints to determine what organizational role-based priority should be given. In various embodiments, such role-based priority can be used as a base level of priority for an endpoint while other factors can cause the priority level to increase and/or decrease further.

In various embodiments, priority values can be set manually by an information technology ("IT") administrator. For example, the IT administrator can set the priority for an endpoint (and, accordingly, for all backup messages generated by the endpoint) when the endpoint is set up in the system or at any other time. In various embodiments, such manually-set priority can be used as a base level of priority for an endpoint while other factors can cause the priority level to increase and/or decrease further.

In various embodiments, a priority value of a message can be determined based on how close the endpoint device from which the message is received is to completing a backup. For example, an endpoint that is close to completing backup can be assigned higher priority. How close an endpoint is to completing backup can be measured as a percentage of data remaining to be uploaded or as a total remaining volume of data to be uploaded from the endpoint. Particularly when a new device (or a group of devices) is introduced into a network, or during an endpoint centralization process, it may be important to backup the endpoint quickly to complete integrating the endpoint into the enterprise system. In these cases, it can be favorable to accelerate the backup process as it gets closer to completion.

In various embodiments, a priority value of a message can be determined based on the amount of time that passed since the endpoint device from which the message is received was most recently backed up. Namely, a device that has not been backed up for a long time is more likely to contain information that has not been stored in the backup server. Accordingly, it may be advantageous to give higher priority to these devices to ensure that they are backed up promptly when connected to the network. Hence, the system can assign higher priority to endpoints that have not been backed up for longer times.

In various embodiments, a priority value of a message can be determined based on a comparison of a current upload speed with an average upload speed of the endpoint device from which the message is received. Namely, if an endpoint's historical upload speed (measured as an average, a moving average, or an exponential moving average over a predefined time period) is lower than the upload speed that is available at a particular time, then the endpoint can be given higher priority at that time to take advantage of the better-than-usual connection to the endpoint.

In various embodiments, a priority value of a message can be determined based on the average connected time of the endpoint device from which the message is received to the backup server. Namely, if an endpoint is connected infrequently, then the system can take advantage of the times when the endpoint is actually connected by assigning a higher priority value to messages received from the endpoint. Conversely, if an endpoint is connected frequently, then it has ample opportunity to perform a backup without higher priority.

In various embodiments, a priority value of a message can be determined based on the uniqueness of the files in the endpoint that are to be backed up. Namely, files that are unique, or unlike other files available on the backup server, may be more likely to contain valuable information that cannot be easily restored if lost. Hence, it may be favorable to assign higher priority to backing up such files. For example, unique files are more likely to contain information that the user of the endpoint created instead of obtaining from elsewhere. In various embodiments, uniqueness of a file can be determined by the system based on a comparison of a digital signature of the file, such as a hash or a checksum, with digital signatures of files in the backup database. For example, the system can determine a ration of unique files to non-unique files in the data that an endpoint is attempting to back up. Consequently, an endpoint with a higher ration of unique backup files can be given higher priority.

In various embodiments, a user of an endpoint may also be given an option, enabled through the endpoint's user interface for example, to boost priority of certain files through an "immediate backup" function. For example, this may be useful to a user who needs to disconnect her endpoint but desires to backup certain information, or the entire endpoint, prior to disconnecting. The user can be given a function, enabled through the endpoint's user interface, to select certain files or to back up the entire machine immediately. Activating the function can put the corresponding data into higher priority for backup.

In various embodiments, the system can further determine a priority value of a message based on how critical the data in the message is. For example, the system can be configured to automatically accord higher priority values to predetermined types of files; such as files that are known to be of high importance. For example, such files can be files that are crucial to endpoint operation, or files that are known to contain data of high importance that needs to be immediately protected. The system can be configured to recognize such critical files and accord a message higher importance when such critical files are present.

As described above, the system can take into account numerous factors to determine a priority value for a backup message. In various embodiment, the effects of certain factors can increase priority. In other embodiments, priority can be decreased based on certain factors. In an embodiment, a received message can be given a default priority value, for example an average or median priority value, and the value can be adjusted based on various priority factors. In another embodiment, a received message can be given a default priority value based on the organizational role corresponding to the endpoint, and the value can be adjusted based on various priority factors. In various embodiments, an endpoint to which any factors in the system don't apply can be assigned a default priority value, which can be an average or a median value.

Figure 2:
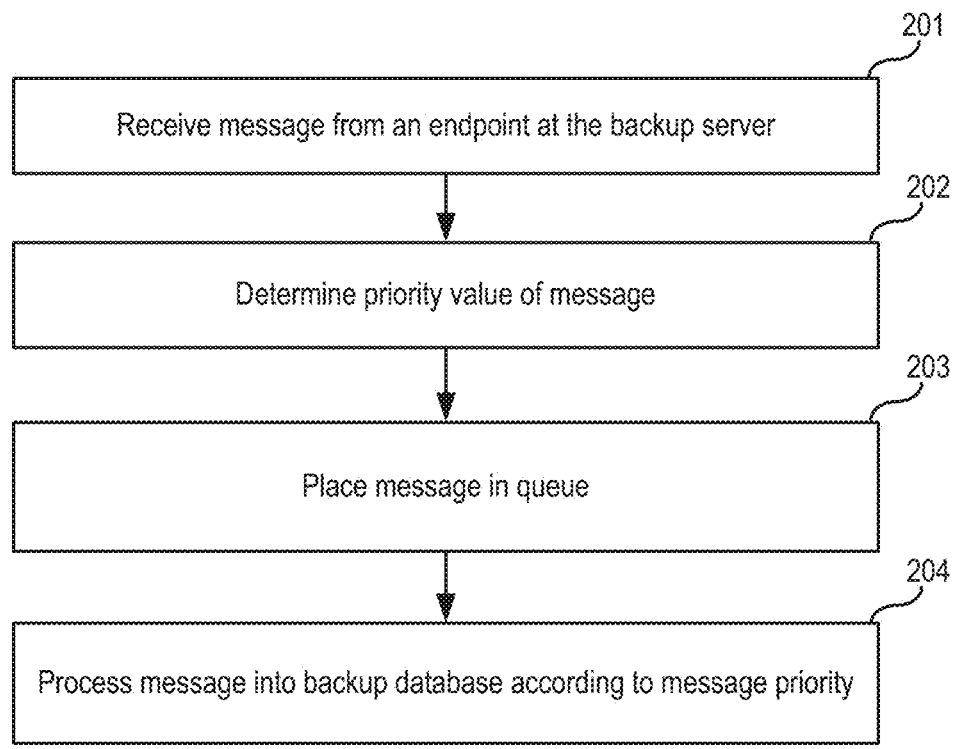
FIG. 2 illustrates an example process flow for prioritized endpoint backup, in accordance with various embodiments.

FIG. 2 illustrates an example process flow for prioritized endpoint backup, in accordance with various embodiments. As illustrated in the example process flow of FIG. 2, the backup server can receive a message from an endpoint device 201 containing data to be backed up. The backup server can determine the priority value of the message 202 based on numerous factors, as described above. Subsequently, the message can be placed into the queue 203 until its turn comes to be processed. The message is processed from the queue to the backup database (written to the backup database) according to the priority value of the message 204. Namely, processing of messages from the queue with higher priority values is prioritized, for example by writing the messages to disk faster than or before messages with lower priority values.

Figure 3:
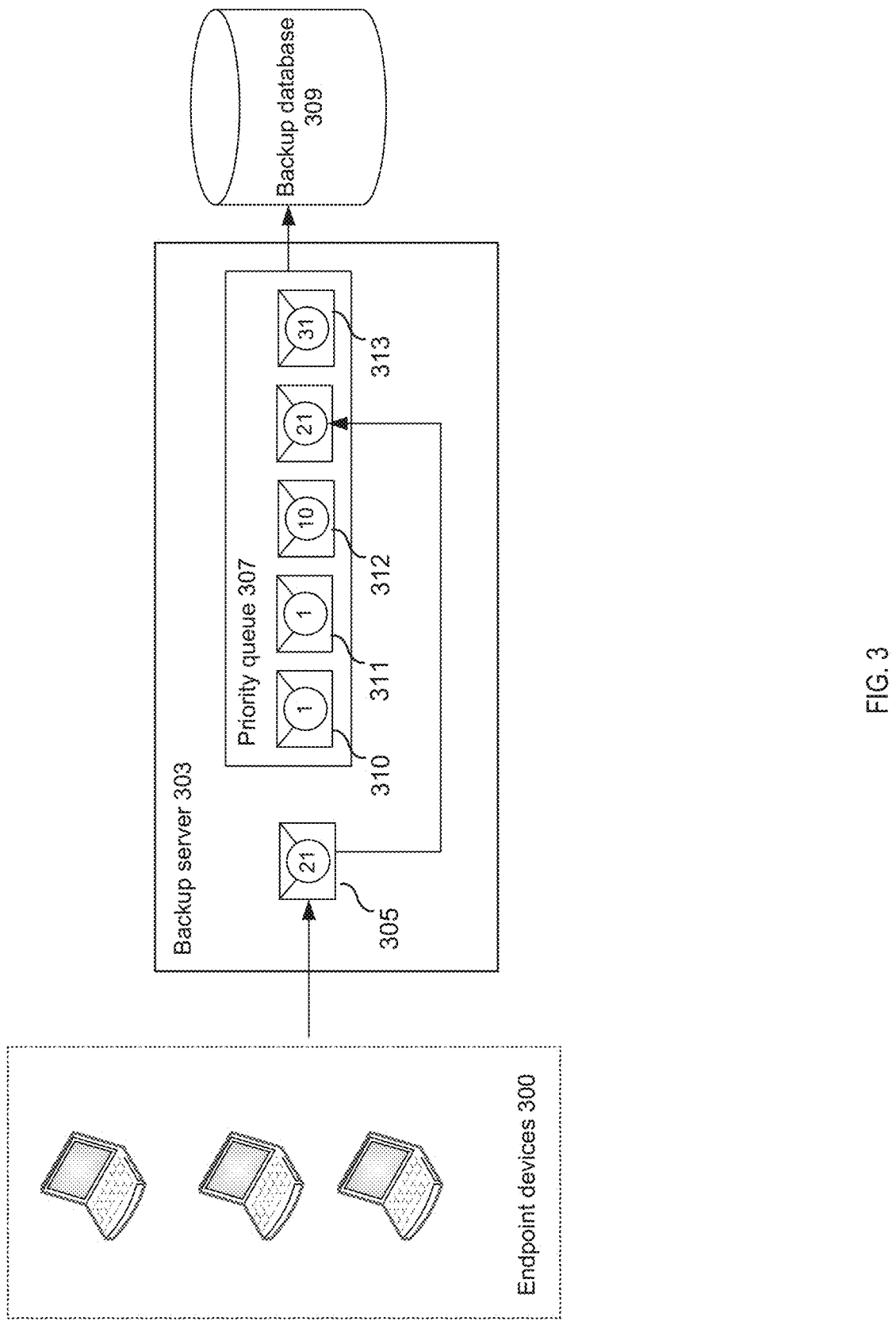
FIG. 3 illustrates an example block diagram of a plain priority queue in a backup server, in accordance with various embodiments.

FIG. 3 illustrates an example block diagram of a plain priority queue in a backup server, in accordance with various embodiments. As illustrated in the example of FIG. 3, a backup message 305 is conveyed from endpoint devices 300 to a backup server 303. In the example, the priority value of the message 305 is determined to be the value of 21, (as indicated by the number in the circle) which may be determined based on various factors as described elsewhere in this description. The priority value of each messages in the figure is illustrated by a number in a circle on the corresponding message. The message 305 is then placed in a priority queue 307 according to the message's 305 priority value of 21. As illustrated, the message 305 is placed in the queue after lower priority messages 310, 311, 312 but before higher priority message 313. Subsequently, message 313 is written to a backup database 309 before message 305 due to the message's 313 higher priority.

A possible issue with a queue implementation as described in FIG. 3 is starvation of lower priority messages. Namely, if higher priority messages continuously enter the queue, lower priority messages (e.g., 310, 311) might never have a chance to be backed up, or the backup of those messages may take an inappropriately long time to complete. To avoid such starvation issues, priority boosting (aging) can be used. In an example of priority boosting (aging), when certain quantities of new messages enter the queue, the priority value of all messages in the queue is increased. For example, the priority value of all messages in the queue can increase by a predetermined amount every time a certain number of messages enters the queue. For example, every time four new messages enter the queue, the priority value of all messages currently in the queue can increase by one point. In another embodiment, the priority value of higher priority messages can be set to increase more frequently or by a larger amount. For example, messages with priority of 1 can increase by one point for every 10 new messages that enter the queue, messages with a priority of 10 can increase by 2 points for every 5 messages that enter the queue, and messages with a priority of 20 can increase by 4 points for every 2 messages that enter the queue.

Figure 4:
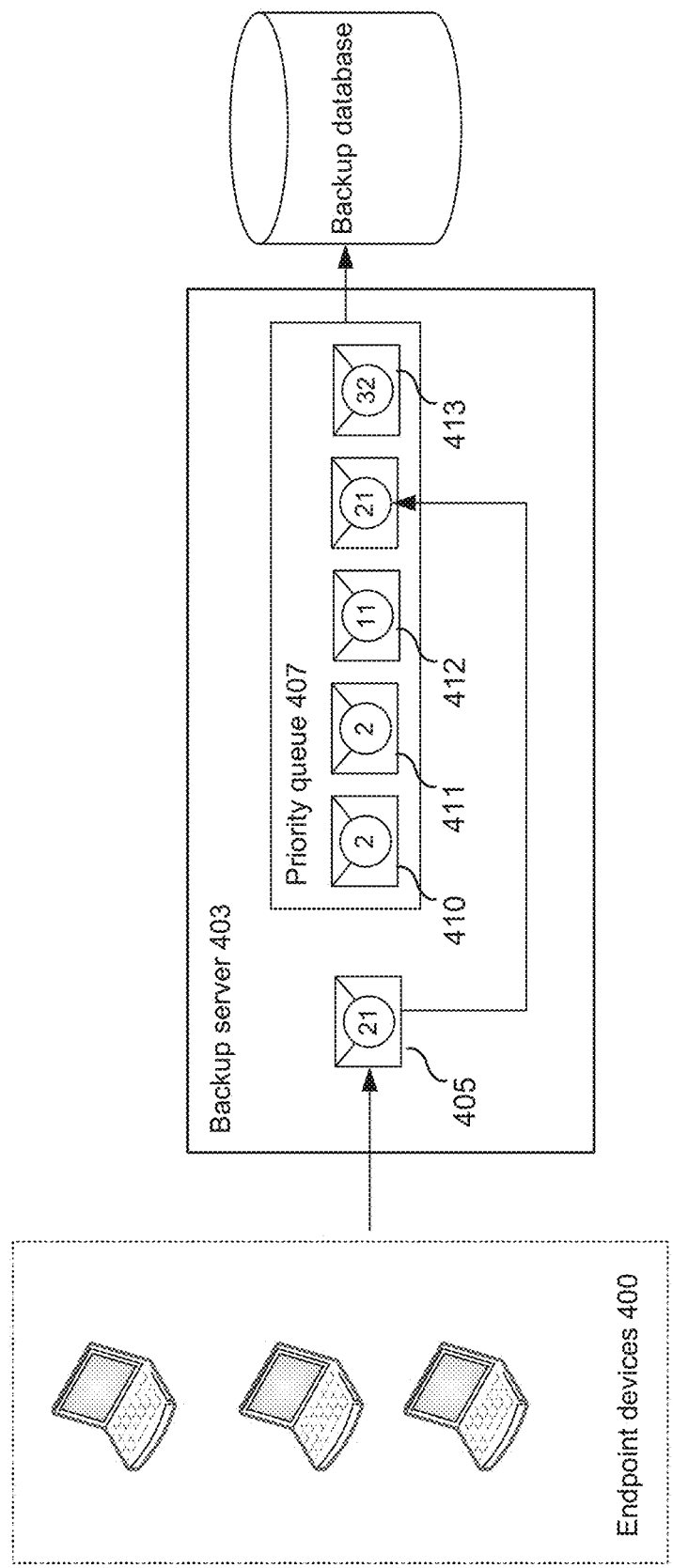
FIG. 4. Illustrates an example block diagram of a priority queue implementing priority boosting, in accordance with various embodiments.

FIG. 4. Illustrates an example block diagram of a priority queue implementing priority boosting (aging), in accordance with various embodiments. The example of FIG. 4 illustrates the priority queue of FIG. 3 with an implementation of priority boosting, such that the priority of all messages is boosted by one point for every message received in the queue. As illustrated, a message 405 is received at backup server 403 from endpoint devices 400. The message 405 has a priority value of 21 and is placed in priority queue 407 in a position corresponding to the message's 405 priority value. Consequently, due to priority boosting, the priority values of messages 410, 411, 412, 413 in the queue 403 is boosted by one point. Hence, the priority value of message 410 becomes 2 (by adding 1 to the priority value of message 310 in FIG. 3). Similarly, the priority value of message 411 becomes 2, the priority value of message 412 becomes 11, and the priority value of message 413 becomes 32. Accordingly, because the priority values of all messages are gradually increased as new messages enter the queue 403, every message will eventually be stored regardless of how many higher-priority messages may be entering the queue 403.

Figure 5:
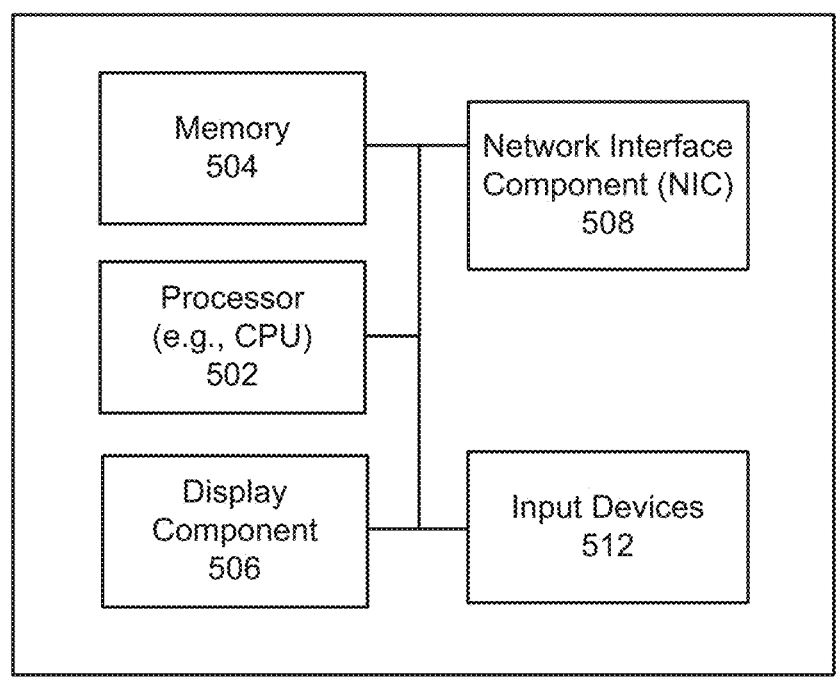
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in physical memory component 504. The memory component 504 can include many types of memory, data storage, or non-transitory computer-readable storage media, such as random access memory (RAM) storing program instructions for execution by the processor 502, a separate form of storage for images or data, a removable memory for sharing information with other devices and the like. The computing device typically can further comprise a display component 506, such as a monitor, a touch screen, liquid crystal display (LCD), or the like. In various embodiments, the computing device will include at least one input device 512 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 508 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   receiving at a backup server messages containing backup data from a plurality of endpoint devices assigned to different users, wherein the endpoint devices send the messages to the backup server to backup data on a backup database;
   on the backup server, determining a priority value corresponding to each message received from the plurality of endpoint devices based on factors related to the endpoint device from which the message is received, the priority value indicating a level of importance for backing up the corresponding message, such that a message with a higher priority value is given priority to be backed up before a message with a lower priority value;
   determining an endpoint priority value for an endpoint device in the plurality of endpoint devices, wherein priority values of messages received from the endpoint device are determined based on the determined endpoint priority value, the endpoint priority value being determined by:
      determining backup data on the endpoint device to be backed up on the backup database;
      determining unique files in the endpoint device backup data, wherein a file is deemed unique if it is not present in stored backup data of any of the plurality of endpoint devices on the backup database;
      determining the endpoint priority value based on the unique files;
   on the backup server, placing the messages received from the plurality of endpoint devices assigned to different users into a queue that temporarily stores the messages before the messages are written to the backup database; and
   processing the messages from the queue to the backup database in an order that is based on the priority value corresponding to each message.

2. The method of claim 1, wherein processing the messages from the queue to the backup database according to the priority value corresponding to each message comprises at least one of:
   writing messages in the queue with a higher corresponding priority value to the database before messages with a lower corresponding priority value; or
   allocating more resources to writing messages with a higher corresponding priority value to the database than to messages with a lower corresponding priority value.

3. The method of claim 1, wherein the priority value corresponding to a message is further determined based on an organizational role corresponding to the endpoint device from which the message is received.

4. The method of claim 1, wherein the priority value corresponding to a message is further determined based on an amount of time that passed since the endpoint device from which the message is received was backed up last.

5. The method of claim 1, wherein the priority value corresponding to a message is further determined based on at least one of:
   a comparison of a current upload speed with an average upload speed of the endpoint device from which the message is received; or
   an average connected time to the backup server of the endpoint device from which the message is received.

6. The method of claim 1, wherein the endpoint priority value is determined based on a number of the unique files in the backup data.

7. The method of claim 1, wherein the endpoint priority value is determined based on a ratio of the unique files to non-unique files in the backup data.

8. A computing device, comprising:
   at least one processor; and
   memory including instructions that, when executed by the at least one processor, cause the computing device to:
      receive at a backup server messages containing backup data from a plurality of endpoint devices assigned to different users, wherein the endpoint devices send the messages to the backup server to backup data on a backup database;
      on the backup server, determine a priority value corresponding to each message received from the plurality of endpoint devices based on factors related to the endpoint device from which the message is received, the priority value indicating a level of importance for backing up the corresponding message, such that a message with a higher priority value is given priority to be backed up before a message with a lower priority value;
      determine an endpoint priority value for an endpoint device in the plurality of endpoint devices, wherein priority values of messages received from the endpoint device are determined based on the determined endpoint priority value, the endpoint priority value being determined by:
         determining backup data on the endpoint device to be backed up on the backup database;
         determining unique files in the endpoint device backup data, wherein a file is deemed unique if it is not present in stored backup data of any of the plurality of endpoint devices on the backup database;
         determining the endpoint priority value based on the unique files;
      on the backup server, place the messages received from the plurality of endpoint devices assigned to different users into a queue that temporarily stores the messages before the messages are written to the backup database; and
      process the messages from the queue to the backup database in an order that is based on the priority value corresponding to each message.

9. The computing device of claim 8, wherein processing the messages from the queue to the backup database according to the priority value corresponding to each message comprises at least one of:
   writing messages in the queue with a higher corresponding priority value to the database before messages with a lower corresponding priority value; or
   allocating more resources to writing messages with a higher corresponding priority value to the database than to messages with a lower corresponding priority value.

10. The computing device of claim 8, wherein the priority value corresponding to a message is further determined based on an organizational role corresponding to the endpoint device from which the message is received.

11. The computing device of claim 8, wherein the priority value corresponding to a message is further determined based on an amount of time that passed since the endpoint device from which the message is received was backed up last.

12. The computing device of claim 8, wherein the priority value corresponding to a message is further determined based on at least one of:
- a comparison of a current upload speed with an average upload speed of the endpoint device from which the message is received; or
- an average connected time to the backup server of the endpoint device from which the message is received.

13. The computing device of claim 8, wherein the endpoint priority value is determined based on a number of the unique files in the backup data.

14. The computing device of claim 8, wherein the endpoint priority value is determined based on a ratio of the unique files to non-unique files in the backup data.

15. A non-transitory computer readable storage medium comprising one or more sequences of instructions, the instructions when executed by one or more processors causing the one or more processors to execute the operations of:
- receiving at a backup server messages containing backup data from a plurality of endpoint devices assigned to different users, wherein the endpoint devices send the messages to the backup server to backup data on a backup database;
- on the backup server, determining a priority value corresponding to each message received from the plurality of endpoint devices based on factors related to the endpoint device from which the message is received, the priority value indicating a level of importance for backing up the corresponding message, such that a message with a higher priority value is given priority to be backed up before a message with a lower priority value;
- determining an endpoint priority value for an endpoint device in the plurality of endpoint devices, wherein priority values of messages received from the endpoint device are determined based on the determined endpoint priority value, the endpoint priority value being determined by:
  - determining backup data on the endpoint device to be backed up on the backup database;
  - determining unique files in the endpoint device backup data, wherein a file is deemed unique if it is not present in stored backup data of any of the plurality of endpoint devices on the backup database;
  - determining the endpoint priority value based on the unique files;
- on the backup server, placing the messages received from the plurality of endpoint devices assigned to different users into a queue that temporarily stores the messages the before messages are written to the backup database; and
- processing the messages from the queue to the backup database in an order that is based on the priority value corresponding to each message.

16. The non-transitory computer readable storage medium of claim 15, wherein processing the messages from the queue to the backup database according to the priority value corresponding to each message comprises at least one of:
- writing messages in the queue with a higher corresponding priority value to the database before messages with a lower corresponding priority value; or
- allocating more resources to writing messages with a higher corresponding priority value to the database than to messages with a lower corresponding priority value.

17. The non-transitory computer readable storage medium of claim 15, wherein the priority value corresponding to a message is further determined based on an organizational role corresponding to the endpoint device from which the message is received.

18. The non-transitory computer readable storage medium of claim 15, wherein the priority value corresponding to a message is further determined based on an amount of time that passed since the endpoint device from which the message is received was backed up last.

19. The non-transitory computer readable storage medium of claim 15, wherein the priority value corresponding to a message is further determined based on at least one of:
- a comparison of a current upload speed with an average upload speed of the endpoint device from which the message is received; or
- an average connected time to the backup server of the endpoint device from which the message is received.

20. The non-transitory computer readable storage medium of claim 15, wherein the endpoint priority value is determined based on one of:
- a number of the unique files in the backup data; or
- a ratio of the unique files to non-unique files in the backup data.

* * * * *